United States Patent
Cordier et al.

(10) Patent No.: US 7,079,773 B2
(45) Date of Patent: Jul. 18, 2006

(54) POWER FEEDING FOR AN OPTICAL TRANSMISSION SYSTEM

(75) Inventors: Alain Cordier, Vaux-le-Penil (FR); Tony Farrar, Bexley (GB); Carol Webb, London (GB)

(73) Assignee: Alcatel, Paris (FR)

( * ) Notice: Subject to any disclaimer, the term of this patent is extended or adjusted under 35 U.S.C. 154(b) by 705 days.

(21) Appl. No.: 10/175,892

(22) Filed: Jun. 21, 2002

(65) Prior Publication Data

US 2002/0196505 A1    Dec. 26, 2002

(30) Foreign Application Priority Data

Jun. 22, 2001   (GB)   ................... 0115372.5

(51) Int. Cl.
*H04B 10/18* (2006.01)
*G05F 5/04* (2006.01)
*G05F 1/14* (2006.01)
*E02D 29/00* (2006.01)

(52) U.S. Cl. .................... 398/104; 398/105; 333/12; 379/414; 379/416; 379/413; 379/392.01

(58) Field of Classification Search ........ 398/104–105; 333/12
See application file for complete search history.

(56) References Cited

U.S. PATENT DOCUMENTS

| | | | |
|---|---|---|---|
| 3,868,484 A * | 2/1975 | Bolton et al. ............ 340/425.2 |
| 4,096,363 A * | 6/1978 | Earp ........................... 323/357 |
| 4,191,912 A * | 3/1980 | Gerry ...................... 315/209 R |
| 5,495,381 A * | 2/1996 | Mrowiec et al. ............... 361/20 |
| 5,719,693 A | 2/1998 | Tanoue |
| 6,091,025 A * | 7/2000 | Cotter et al. ............ 174/110 R |
| 6,091,670 A * | 7/2000 | Oliver et al. .................. 367/76 |
| 6,127,741 A * | 10/2000 | Matsuda et al. .............. 307/36 |
| 6,546,100 B1 * | 4/2003 | Drew ......................... 379/415 |

FOREIGN PATENT DOCUMENTS

EP    989 717 A2    9/1999

OTHER PUBLICATIONS

Calvo, O.A., "Power feed equipment for the SL undersea lightwave cable", IEEE Telecommunications Energy Conference, 1988. INTELEC '88., Oct. 30-Nov. 2, 1988, p. 194-200.*

Zener diode (in Electrical and electronic engineering). Dictionary of Engineering Terms, Butterworth-Heinemann (2001).*

Transformer. The American Heritage® Dictionary of the English Language (2003).*

Transformer. Newnes Dictionary of Electronics, Newnes (1999).*

* cited by examiner

*Primary Examiner*—Kenneth Vanderpuye
*Assistant Examiner*—Danny Wai Lun Leung
(74) *Attorney, Agent, or Firm*—Sughrue Mion, PLLC

(57) ABSTRACT

A method and an apparatus for optical transmission line power feed interference compensation for compensating for an electrical interference signal in a power feed conductor (12; 52) and in an associated second conductor (14; 54). The interference signal may be produced by electromagnetic induction or by local variation in earth potential. The compensation is performed by producing a variable compensation signal from an electrical interference signal produced in the second conductor and inputting the variable compensation signal onto the power feed conductor, in order substantially to compensate for or cancel the electrical interference signal produced in the power feed conductor.

31 Claims, 3 Drawing Sheets

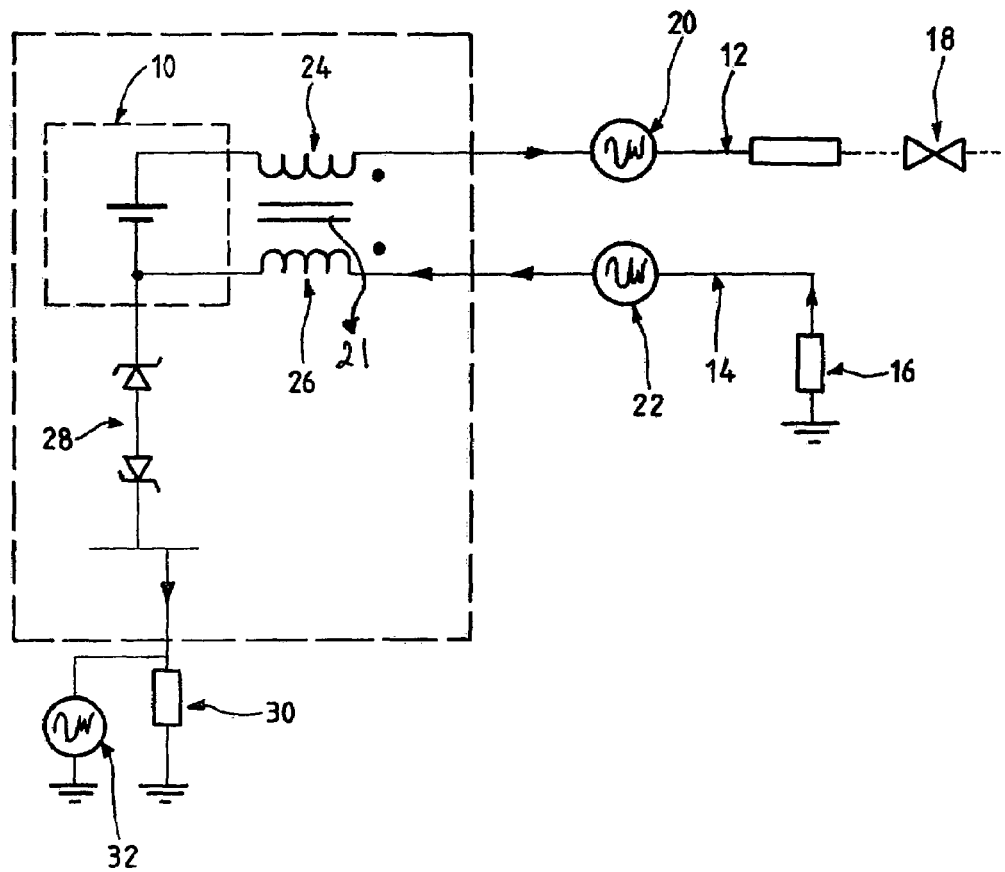
FIG_1

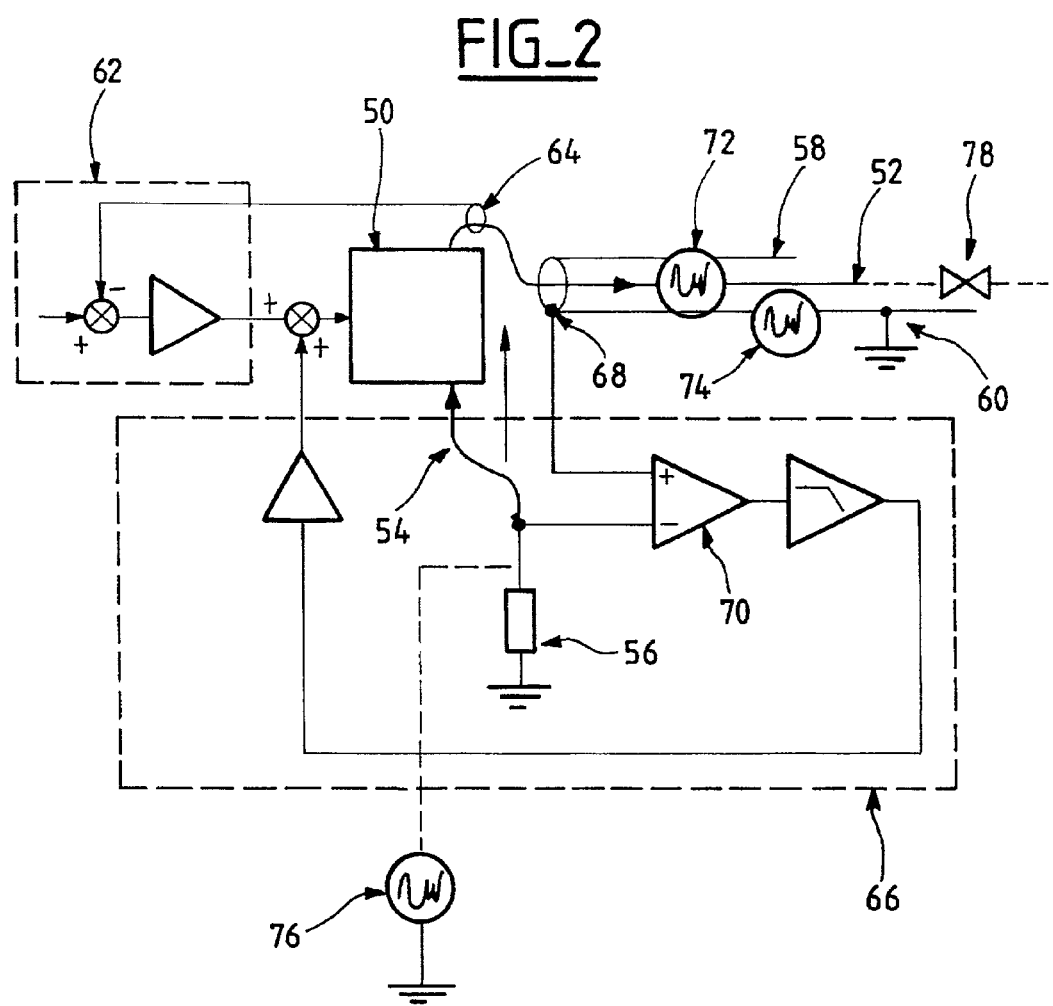
FIG_2

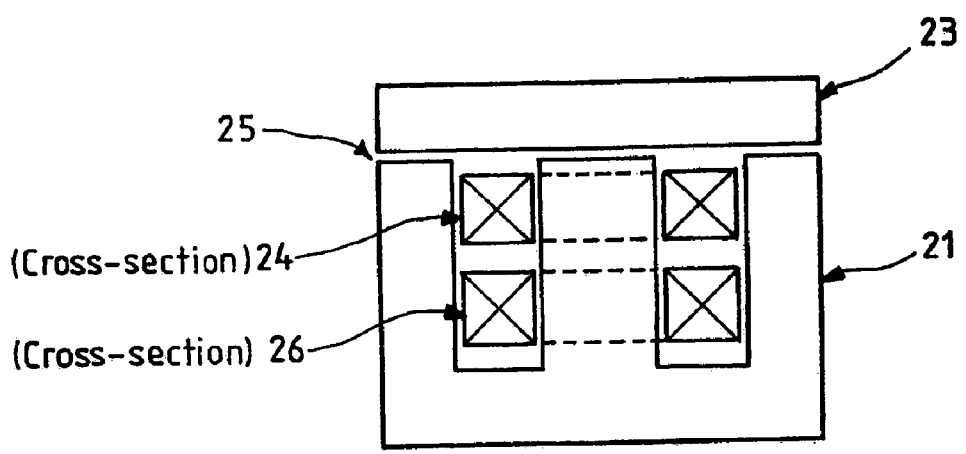
FIG_3
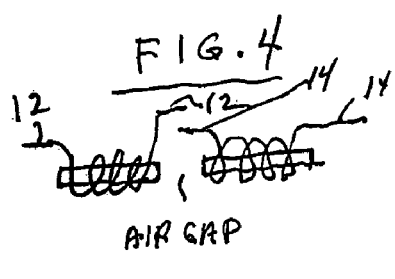
FIG.4
AIR GAP
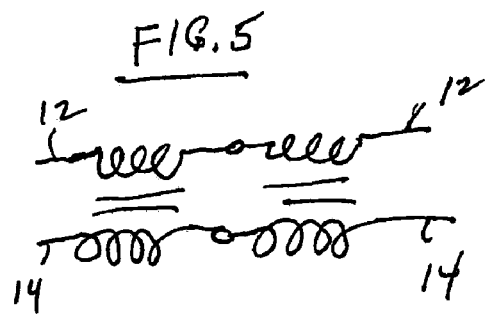
FIG.5

POWER FEEDING FOR AN OPTICAL TRANSMISSION SYSTEM

BACKGROUND OF THE INVENTION

The present invention relates to power feeding for an optical transmission system. More particularly, it relates to an apparatus and method for the compensation of fluctuations in the power feed apparatus for an optical transmission system.

Optical transmission systems such as submarine optical communications systems transmit light signals over long distances. Due to optical attenuation effects in the optical transmission lines, it is usually necessary to boost the light signals using repeaters. In order to function, repeaters require an electrical power feed. In addition, there are other devices associated with the optical transmission line which require an electrical power feed.

Typically, the power feed is provided to the repeaters and other devices by a power feed conductor which forms part of a cable including both the conductor and the optical transmission line. The power itself is provided by a high voltage (typically around 8 kV to 20 kV) DC power converter. In effect, this acts as a constant current source, providing a current of around 1A, for example. The repeaters have quite stringent power demands in order to function satisfactorily. For this reason, the current in the power feed conductor should be kept as constant as possible.

The DC power converter is usually located in a terminal on land for easy access and maintenance. For submarine optical transmission lines, the cable must extend between the sea and land to connect to the DC power converter.

Clearly, fluctuations or perturbations in the voltage applied across the repeaters and/or in the current flowing through the repeaters can have a deleterious effect on the transmission of optical data signals. Such fluctuations can arise due to electromagnetic interference, giving rise to induced currents flowing in the power feed conductor.

Similarly, fluctuations can arise due to a change in the local earth potential at or near to the DC power converter. Due to its high voltage output, the DC power converter is usually earthed for safety reasons. It is possible for the local earth potential to change close to the earth plate connected to the DC power converter, and this phenomenon is known as "earth potential rise".

To try to avoid these fluctuations, the terminals for housing the DC power converters are usually located close to the sea. In addition, electromagnetically "clean" locations are usually selected for the terminals and for the cable extending from the terminals to the sea.

Typically sources of electromagnetic interference are AC power feeders for transmitting industrial power. As is well known, the frequency of the AC power is usually 50 or 60 Hz.

Increasingly, clean electromagnetic locations are difficult to find. In addition, there is greater demand for the terminals to be located further inland than has previously been the case. This increases the length of the land section of the cable and so increases the likelihood of inductive interference at industrial frequencies due to AC power feeders located near to the cable.

Classical shielding measures are often ineffective. Such shielding measures tend to be effective for high frequency (e.g. radio frequency) interference but a very low resistance screen would be necessary to achieve a sensitive screening effect at 50 Hz or 60 Hz. The drawback would be to allow large industrial earth currents to flow through the screen with the risk of creating further interference.

Limitation of the current disturbances by increasing the system impedance with a series inductance can be attempted, but this solution is not suitable for high magnitude 50 Hz or 60 Hz interference. For an effective limitation, a large inductance would be necessary but this could jeopardise the stability of the control loop for the power feed and could lead to unwanted resonance with the high capacitance of the long submarine cable.

Symmetrical cable arrangements or twisted power cables are only effective for low magnitude disturbances. Safety rules do not permit the power feed to operate as a totally floating source, and the low voltage terminal potential has to be limited by a voltage protection device (usually at less than 100 volts).

Conventional power feed equipment current control loops are not sufficient to limit the disturbances discussed above. Such current control loops are necessarily phase shifted and their gain is limited by stability criteria.

SUMMARY OF THE INVENTION

Accordingly, in a first aspect, the present invention provides an optical transmission line power feed interference compensation apparatus produced for compensating, in use, for an electrical interference signal in a power feed conductor and in an associated second conductor, the apparatus including compensation means for producing a variable compensation signal from the electrical interference signal produced in the second conductor and input means for inputting the variable compensation signal onto the power feed conductor, in order substantially to compensate for or cancel the electrical interference signal produced in the power feed conductor.

The invention therefore typically provides an apparatus by which variations in the power feed may be stabilised. Preferably, in terms of this invention, the production of an electrical interference signal in a conductor includes a signal induced due to electromagnetic interference and also includes a signal applied to a conductor due to a local variation in earth potential.

Typically, the apparatus has first coupling means couplable to a power feed conductor, second coupling means couplable to a second conductor associated with the power feed conductor.

Preferably, the compensation means includes a first coil connected to the power feed conductor and preferably also includes a second coil connected to the second conductor. Typically, the coils are wound so that magnetic fields produced by the coils as a result of the electrical interference signal substantially cancel with each other.

Preferably, the first coil is inductively coupled to the second coil.

Preferably, the second coil is connectable to earth via earth connection means when the potential of the second conductor exceeds a predetermined value. This predetermined value is preferably up to 100 volts.

Preferably, the earth connection means includes one or more of Zener diodes.

Preferably, the second conductor is a low voltage conductor which extends substantially parallel to and close to part of the power feed conductor. More preferably, the second conductor is coaxial with at least part of the power feed conductor. The second conductor may, for example, be a screening conductor. In addition, the second conductor may be earthed, in use.

Preferably, and as shown in FIG. 4, the first coil is wound on a first ferromagnetic core, and the second coil is preferably wound on a second ferromagnetic core. Typically, the second ferromagnetic core is separated from the first ferromagnetic core by an air gap. Preferably, the air gap is approximately 0.3 mm wide.

Alternatively, the first and second ferromagnetic cores may be connected e.g. both first and second coils may be wound on a common core. In one example, this common core is one limb (e.g. the central limb) of an "E" shaped transformer core. The three open ends are the E shaped core may be bridged by an "I" shaped core in a conventional transformer construction. There may then be an air gap between the "I" core and the open ends of the "E" core.

Since the inductance is determined by the number of turns on the core, the core area and the air gap, in practice the air gap is selected to provide the required inductance.

In preferred embodiments, the inductance may be between 1 and 3H. Preferably the impedance presented by the inductance is high compared to the ground cable impedance.

Preferably, the first and second ferromagnetic cores are laminated soft iron cores.

Preferably, the compensation means has a mutual inductance of approximately 1 to 10H.

As shown in FIG. 5, compensation means may include third and fourth coils, the third coil being in series with the first coil and typically the fourth coil being in series with the second coil, the third and fourth coils preferably being inductively coupled. Effectively the third and fourth coils may be part of a separate unit similar or identical to the first and second coils, thereby increasing the interference voltage compensation capability (by effectively increasing the core area) without providing a single large and heavy unit.

The compensation means is preferably adapted to compensate for electrical interference frequencies in the range 10 to 200 Hz, more preferably 45 to 65 Hz.

Preferably, the apparatus further includes earth potential rise or fall compensation means for substantially compensating for or cancelling an earth potential rise or fall transmitted to the power feed conductor.

Preferably, the apparatus includes high voltage DC output means for connection to the power feed conductor. Typically, the apparatus has a local earth connection for a low voltage conductor of the DC output means.

Preferably, the compensation means includes differential voltage means for outputting a differential voltage signal resultant from the difference between the voltage of the second conductor and the local earth connection.

Preferably, the second conductor is a screening conductor for the power feed conductor.

Typically, the high voltage DC output means has a control input. The control input may be modified by the differential voltage signal so that the high voltage DC output is modifiable to compensate for the electrical interference signal produced in the power feed conductor.

Typically, the second conductor has a sea earth connection.

The compensation means preferably includes filtering means for filtering the differential voltage signal before modification of the control input of the high voltage DC output means.

In a second aspect, the present invention provides a method of compensating for an electrical interference signal produced in a power feed conductor of an optical transmission line, including the steps of:

(1) producing a variable compensation signal using an electrical interference signal produced in a second conductor, associated with the power feed conductor, and
(2) inputting the variable compensation signal onto the power feed conductor and thereby substantially compensating for or cancelling the electrical interference signal produced in the power feed conductor.

The method may incorporate methods of operation of the apparatus according to the first aspect.

Preferably, the variable compensation signal is produced by a magnetic field produced due to the presence of a first coil connected to the power feed conductor and a second coil connected to the second conductor. Typically, the compensation effect is substantially due to mutual inductive coupling of the first and second coils.

Preferably, the method includes the step of connecting the second coil to earth when the potential of the second conductor exceeds a predetermined value, thereby preferably limiting the potential of the second conductor. Preferably, the predetermined value of the potential of the second conductor is up to around 100 volts.

Typically, the method includes a step of obtaining a differential voltage signal by comparing the voltage of the second conductor to the voltage of a local earth connection.

The method may further include the step of inputting the differential voltage signal into control means for controlling the output voltage of a high voltage DC output means connected to the power feed conductor.

The method may include the step of providing a compensation signal in order substantially to compensate for or cancel an earth potential rise transmitted to the power feed conductor.

The method therefore preferably provides a way of controlling the output of the high voltage DC output means in order to compensate for or cancel an electrical interference signal produced in the power feed conductor.

BRIEF DESCRIPTION OF THE DRAWINGS

Preferred embodiments of the invention will now be described, by way of example only, with reference to the accompanying drawings, in which:

FIG. 1 shows a schematic view of a first embodiment of the present invention.

FIG. 2 shows a schematic view of a second embodiment of the present invention.

FIG. 3 shows an embodiment of transformer for use with the present invention.

FIGS. 4 and 5 show additional embodiments of a transformer for use with the present invention.

DETAILED DESCRIPTION OF THE INVENTION

FIG. 1 shows a DC power converter 10 connected in series with a high voltage power feed conductor 12 and a low voltage (or earthing) conductor 14. In this example, the low voltage conductor 14 is earthed at earth connection 16, typically a sea earth.

High voltage power feed conductor 12 is typically a metallic sheet conductor formed around optical fibre transmission lines. It has a series of repeaters 18 to which it supplies power.

Low voltage conductor 14 is typically routed close to and parallel to high voltage conductor 12. Low voltage conductor 14 may, for example, be coaxial with high voltage conductor 12. This arrangement is made so that both conductors "see" the same electrical interference signal (for example an electromagnetic interference signal), indicated as inducing voltage fluctuations 20, 22 in conductors 12, 14, respectively. The closeness of the conductors 12, 14 and their similarity ensure that voltage fluctuations 20, 22 are at least approximately equal in magnitude as well as direction.

The voltage fluctuations 20, 22 cause a varying AC current to flow in each conductor, substantially regardless of the magnitude of the disturbance. This is in addition to any DC current which is being carried by the conductors.

A coil 24 is connected between the high voltage terminal of the DC power converter 10 and the power feed conductor 12. A similar coil 26 is connected between the low voltage terminals of the DC power converter 10 and the low voltage conductor 14.

Coils 24 and 26 are wound in such a direction that they produce equal and opposite magnetic fields. Coils 24 and 26 are inductively coupled so that together they form a mutual inductance.

Coil 24 is wound on a laminated soft iron core. Similarly, coil 26 is wound on a laminated soft iron core. Typically, the core 21 of coils 24 and 26 is an "E" shape, with the coil 24 wound on the middle projection of the "E" shape. "I" shaped core 23 bridges the open ends of the "E" core leaving an air gap 25. Such an arrangement as shown in FIG. 3, allows for suitable magnetic flux linkage between the cores, although clearly other core shapes and/or core arrangements would also be suitable.

For safety reasons, the DC power converter 10 is not allowed to be completely floating. Therefore it must be clamped to earth in electrical terms. In this embodiment, the DC power converter 10 is clamped to earth via a Zener chain 28. This is a series of Zener diodes (whose typical properties are well known) some of which are connected forwards, some of which are connected backwards.

Usually, the maximum voltage at which the Zener chain is allowed to become conducting is around 100 volts or less. This means that if a voltage fluctuation of more than 100 volts (in this example) is "seen" by the low voltage conductor 14, for example, this voltage is in fact limited to 100 volts by the Zener chain conducting to earth. The Zener chain, in effect, "chops" the maximum allowed voltage on the low voltage conductor 14 to 100 volts (in this example).

Thus, when the voltage fluctuation is greater than the limiting voltage of the Zener chain, the Zener diodes are conducting, thereby producing a short circuit from earth to local earth for the AC disturbances. Then, the equivalent voltage source of interference is applied across second coil 26 through the low resistance low voltage conductor and the Zener diodes, and the same voltage is applied across the high voltage winding 24 by mutual inductive coupling, in the opposite direction of the voltage disturbances.

This embodiment provides a good compensation effect, even with a moderate inductance value of a few H (say, 1 to 5H). The result is a small sized magnetic circuit which can be incorporated into the power feed apparatus of an optical transmission system with relative ease.

FIG. 1 also indicates the situation where there is an earth potential rise at earthing electrode 30. The earth potential rise signal is indicated as signal 32. The occurrence of an earth potential rise means that the Zener chain 28 will conduct only when the voltage of the low voltage conductor 14 is greater than the sum of the Zener chain conducting voltage and the earth potential rise. Earth potential rise 32 can be considered to be in series with the lower line disturbance 22 and so is compensated in the same way as disturbance 22.

In this embodiment, the present invention preferably uses only a two winding transformer. Since the ground cable 14, rather than for example a cable screen, effectively draws the interference, this provides a lower resistance. No particular cable screen and/or screen connection is required. Due to the arrangement of the present invention, it is substantially transparent for disturbances of a low magnitude, which are automatically cancelled by the symmetrical arrangement of cables 12 and 14.

FIG. 2 shows a DC power converter 50 connected to a high voltage power feed conductor 52 and an earth conductor 54 earthed at a connection 56. Power feed conductor 52 is shielded by a shielding (or screening) conductor 58, connected to, for example, a sea earth electrode at earth connection 60.

DC power converter 50 is typically a pulse width modulation (PWM) power converter. The output current of the converter 50 is controlled by current control loop 62.

The current in power feed conductor 52 is monitored via current monitoring device 64. A signal from device 64 is fed back into the current control loop 62. In normal operation, the output of the DC power converter 50 can be held at a substantially constant current. In this way, the power feed to the repeaters along the optical transmission line is optimised.

FIG. 2 shows an additional feature. This is a feed forward voltage compensation loop 66. Near its terminal end closest to the DC power converter 50, cable screen 58 is electrically connected at point 68 to one input of a voltage differential device 70, for example an amplifier or similar device.

In practice, the voltage differential device 70 may be an analogue differential amplifier. It may be followed by an insulation amplifier (such as including optical or capacitative barrier or high frequency switch mode transformer) and an analogue low pass filter. It may then be followed by an analogue digital converter and possibly additional digital filtering e.g. including phase shifting tuning and gain adjustment, in order to improve the cancellation of the disturbances of the high voltage side.

A connection to the local earth 56 is made to the other input of the voltage differential device 70. Thus, the voltage differential device 70 effectively measures the difference between the voltage of the local earth 56 and the cable screen 58 at point 68.

The output signal of voltage differential device 70 is filtered and injected into the DC power converter 50 in addition to the control input of the current control loop 62; in effect, the injection of this output signal amounts to modification of the current control loop signal. Therefore, the output of the DC power converter 50 depends upon the difference in voltage between the cable screen 58 and the local earth 56.

A voltage fluctuation may be induced in a conductor by, for example, electromagnetic interference. As discussed above, electromagnetic interference is most likely to occur near the land based section of the optical transmission line. Since the high voltage power feed cable 52 and the cable screen 58 are close together, each will "see" the same electromagnetic interference. Consequently, each will develop a similar voltage fluctuation 72, 74. As discussed above, voltage fluctuation 72 on the high voltage power feed cable 52 can have a deleterious effect on the power feed to the repeaters 78.

Voltage fluctuation 74 will be "measured" by device 70 with reference to the local ground potential. The differential signal produced is then used, after appropriate manipulation, to control the output of DC power converter 50.

The PWM converter 50 can change its output quickly and over a large amplitude range. Therefore, the voltage fluctuation 72 on the power feed conductor 52 can be compensated for by varying the output of the PWM converter 50. Accordingly, the power feed for the repeaters can be kept relatively constant.

An alternative voltage fluctuation which can affect the power feed of the optical transmission system is earth potential rise, as mentioned above. A voltage fluctuation arising from this phenomenon is illustrated in FIG. 2 by signal 76.

A change in the local earth potential is "measured" by device 70 in comparison to the potential of the screen conductor 58. Screen 58 is earthed to a sea reference earth at point 60 and so (in the absence of electromagnetic interference signals) the output of device 70 is a measure of the local earth potential against the sea earth reference potential. In a similar way to that described above, the output of the DC power converter 50 is altered to compensate for this earth potential rise, in order to maintain the constant power feed to the repeaters 78.

This embodiment effectively provides active filtering of the power feed, utilising the high dynamic response of the PWM converter 50. In this embodiment, distant system earth connections and earth cables are no longer required.

The main deleterious voltage fluctuations are high magnitude, low frequency fluctuations, typically caused by 50 Hz or 60 Hz industrial AC power feeds. Due to this low frequency, the compensation electronics in the feed for voltage compensation loop 66 and the PWM converter 50 can keep pace with the voltage fluctuations in order to provide compensation for them.

The above embodiments of the present invention have been described by way of example only. Modifications of these embodiments, further embodiments and modifications thereof will be obvious to the person skilled in the art and as such are in the scope of the present invention.

The invention claimed is:

1. An optical transmission line power feed interference compensation apparatus for compensating for an electrical interference signal in a power feed conductor (12; 52) and in an associated second conductor (14; 54), the apparatus including compensation means for producing a variable compensation signal from an electrical interference signal produced in the second conductor and input means for inputting the variable compensation signal onto the power feed conductor, in order substantially to compensate for or cancel the electrical interference signal produced in the power feed conductor.

2. An apparatus according to claim 1, wherein the production of an electrical interference signal in a conductor includes a signal induced due to electromagnetic interference and/or a signal applied to a conductor due to a local variation in earth potential.

3. An apparatus according to claim 1, wherein the apparatus has first coupling means couplable to a power feed conductor, second coupling means couplable to a second conductor associated with the power feed conductor.

4. An apparatus according to claim 1, wherein the compensation means includes a first coil connected to the power feed conductor and also includes a second coil connected to the second conductor.

5. An apparatus according to claim 4, wherein said coils are wound so that magnetic fields produced by the coils as a result of the electrical interference signal substantially cancel each other.

6. An apparatus according to claim 4, wherein said first coil is inductively coupled to said second coil.

7. An apparatus according to claim 4, wherein the second coil is connectable to earth via earth connection means when the potential of the second conductor exceeds a predetermined value.

8. An apparatus according to claim 7, wherein the earth connection means includes one or more of Zener diodes.

9. An apparatus according to claim 1, wherein the second conductor is a low voltage conductor which extends substantially parallel to and close to part of the power feed conductor.

10. An apparatus according to claim 9, wherein the second conductor is coaxial with at least part of the power feed conductor being a screening conductor.

11. An apparatus according to claim 1, wherein the second conductor is earthed.

12. An apparatus according to claim 4, wherein the first coil is wound on a first ferromagnetic core and the second coil is wound on a second ferromagnetic core.

13. An apparatus according to claim 12, wherein the second ferromagnetic core is separated from the first ferromagnetic core by an air gap.

14. An apparatus according to claim 12, wherein the first and second ferromagnetic cores may be connected to each other for example by means of being wound on a common core.

15. An apparatus according to claim 12, wherein the first and second ferromagnetic cores are laminated soft iron cores.

16. An apparatus according to claim 4, wherein the compensation means includes third and fourth coils, the third coil being in series with the first coil and the fourth coil being in series with the second coil, the third and fourth coils being inductively coupled.

17. An apparatus according to claim 16, wherein the third and fourth coils may be part of a separate unit similar or identical to the first and second coils, thereby increasing the interference voltage compensation capability.

18. An apparatus according to claim 1, wherein the compensation means is preferably adapted to compensate for electrical interference frequencies in the range 10 to 200 Hz.

19. An apparatus according to claim 1, wherein the apparatus further includes earth potential rise or fall compensation means for substantially compensating for or cancelling an earth potential rise or fall transmitted to the power feed conductor.

20. An apparatus according to claim 19, wherein the apparatus includes high voltage DC output means for connection to the power feed conductor.

21. An apparatus according to claim 19, wherein the apparatus has a local earth connection for a low voltage conductor of the DC output means.

22. An apparatus according to claim 20, wherein the compensation means includes differential voltage means for outputting a differential voltage signal resultant from the difference between the voltage of the second conductor and the local earth connection.

23. An apparatus according to claim 22, wherein the high voltage DC output means has a control input being modifiable by the differential voltage signal so that the high voltage DC output is modifiable to compensate for the electrical interference signal produced in the power feed conductor.

24. An apparatus according to claim 23, wherein the compensation means includes filtering means for filtering the differential voltage signal before modification of the control input of the high voltage DC output means.

25. A method of compensating for an electrical interference signal produced in a power feed conductor (12; 52) of an optical transmission line, including the steps of:
   (a) producing a variable compensation signal using an electrical interference signal produced in a second conductor (14; 54), associated with the power feed conductor (12; 54), and
   (b) inputting the variable compensation signal onto the power feed conductor and thereby substantially compensating for or cancelling the electrical interference signal produced in the power feed conductor.

26. A method according to claim 25, wherein the variable compensation signal is produced by a magnetic field produced due to the presence of a first coil connected to the power feed conductor and a second coil connected to the second conductor.

27. A method according to claim 26, wherein the method includes the step of connecting the second coil to earth when the potential of the second conductor exceeds a predetermined value, thereby preferably limiting the potential of the second conductor.

28. A method according to claim 25, wherein the method includes a step of obtaining a differential voltage signal by comparing the voltage of the second conductor to the voltage of a local earth connection.

29. A method according to claim 28, further including the step of inputting the differential voltage signal into control means for controlling the output voltage of a high voltage DC output means connected to the power feed conductor.

30. The apparatus according to claim 18, wherein said range is 45 to 65 Hz.

31. The apparatus according to claim 13, wherein said air gap is approximately 0.3 mm wide.

* * * * *